United States Patent [19]

Solek

[11] 4,438,859
[45] Mar. 27, 1984

[54] ELECTRICAL JUNCTION AND OUTLET BOX

[75] Inventor: Leszek Solek, St.-Lambert, Canada

[73] Assignee: Commander Electrical Materials, Inc., St. Jean, Canada

[21] Appl. No.: 517,935

[22] Filed: Jul. 29, 1983

Related U.S. Application Data

[63] Continuation of Ser. No. 360,121, Mar. 19, 1982, abandoned.

[51] Int. Cl.³ .............................................. H02G 3/08
[52] U.S. Cl. ...................................... 220/3.2; 220/3.3; 220/3.5; 220/62
[58] Field of Search .............................. 220/3.2–3.94, 220/62; 174/52 R, 53, 57, 58

[56] References Cited

U.S. PATENT DOCUMENTS

| | | | |
|---|---|---|---|
| 550,648 | 12/1895 | Scott | 229/3.2 |
| 1,557,066 | 10/1925 | Krantz | 220/3.94 X |
| 1,763,160 | 6/1930 | Knight | 220/3.94 |
| 2,016,284 | 10/1935 | Knight | 220/3.2 X |
| 2,204,695 | 6/1940 | Pond | 220/62 X |
| 2,214,968 | 9/1940 | MacMillen | 220/3.9 |
| 2,619,564 | 11/1952 | Raleigh | 220/3.92 X |
| 2,732,090 | 1/1956 | Karlin | 220/3.2 |
| 2,809,763 | 10/1957 | Clark | 220/3.9 |
| 3,083,856 | 4/1963 | Appleton | 220/3.2 |
| 3,763,522 | 10/1973 | Krzyzanowski | 229/37 R X |

FOREIGN PATENT DOCUMENTS

| | | | |
|---|---|---|---|
| 493470 | 6/1953 | Canada | 220/3.3 |
| 667023 | 2/1952 | United Kingdom | 220/62 |

Primary Examiner—William Price
Assistant Examiner—Gary E. Elkins
Attorney, Agent, or Firm—Larson & Taylor

[57] ABSTRACT

Unitary folded metal electrical wiring boxes having the strength and rigidity of drawn one-piece boxes without the need for weld points comprise a flat polygonal base with sidewalls provided with mated extended portions and indented portions at the corners. Tabs on one sidewall extension fold over the top edge of the adjacent sidewall, engaging a notch on the second sidewall to interlock the sidewalls at each corner.

1 Claim, 2 Drawing Figures

ELECTRICAL JUNCTION AND OUTLET BOX

This is a continuation of application Ser. No. 360,121, filed Mar. 19, 1982, and now abandoned.

BACKGROUND OF THE INVENTION

This invention relates to electrical junction and outlet boxes. More particularly, it is concerned with electrical junction and outlet boxes of folded unitary construction.

Many electrical junction and outlet boxes presently in use are fabricated from a single sheet of metal which is drawn and shaped to the desired configuration. Drawn one-piece boxes have found favor in the industry because of their strength and structural integrity. One drawback of fabricating deep drawn boxes from plated sheet metal, however, is the formation of stress cracks in the surface plating and nonuniformity of side wall thickness which result from the drawing operation. Thus, for example, in the case of galvanized sheet steel commonly employed in the manufacture of wiring boxes, the box must be re-plated following the drawing step to forestall rusting. Drawn boxes are generally much more expensive to fabricate than boxes formed from separate side and bottom portions which are joined together by welding.

Electrical junction and outlet boxes fabricated of separate sidewall and bottom portions are known in the art. However, these multi-part boxes often lack the structural rigidity of one-piece boxes and frequently require elaborate interlocking or dovetailing tabs, slots and the like or welding to achieve strength. U.S. Pat. No. 3,877,601 to Evans et al., for example, describes a one-piece wiring box in which the walls and base are stamped from one piece of metal. The walls are folded up and then welded to provide the rigidity and strength in the finished box.

OBJECTS OF THE INVENTION

It is therefore an object of the present invention to provide an improved electrical junction and outlet box.

It is another object of the present invention to provide an electrical junction and outlet box having one-piece folded construction.

It is a further object of the present invention to provide a folded electrical junction and outlet box having strength and structural integrity while obviating the need for weld points.

SUMMARY OF THE INVENTION

These and other objects and advantages are achieved in accordance with the present invention wherein a unitary folded metal electrical wiring box comprises a generally flat base portion having a polygonally shaped periphery defined by a plurality of angularly disposed straight edges, first and second adjacent sidewall portions, each having a first and second edge, each of said sidewall portions disposed generally perpendicularly to the base portion and integrally joined thereto along a portion of the first edge of each sidewall portion, the first edge being a fold line coincident with a straight edge of the base portion. The first and second sidewall portions are disposed at an angle with one another to form a corner region, the first sidewall portion providing an indentation adjacent to the corner region. The second sidewall portion provides an extended portion folded at the corner region to lie generally parallel to the first sidewall portion and to mate with the indentation in the first sidewall portion. The extended portion of the second sidewall portion has means for engaging the first sidewall portion.

For a better understanding of the present invention, together with other and further objects, advantages and capabilities thereof, reference is made to the following disclosure and appended claims in connection with the above-described drawings.

DETAILED DESCRIPTION OF THE PREFERRED EMBODIMENT

Figure 1:
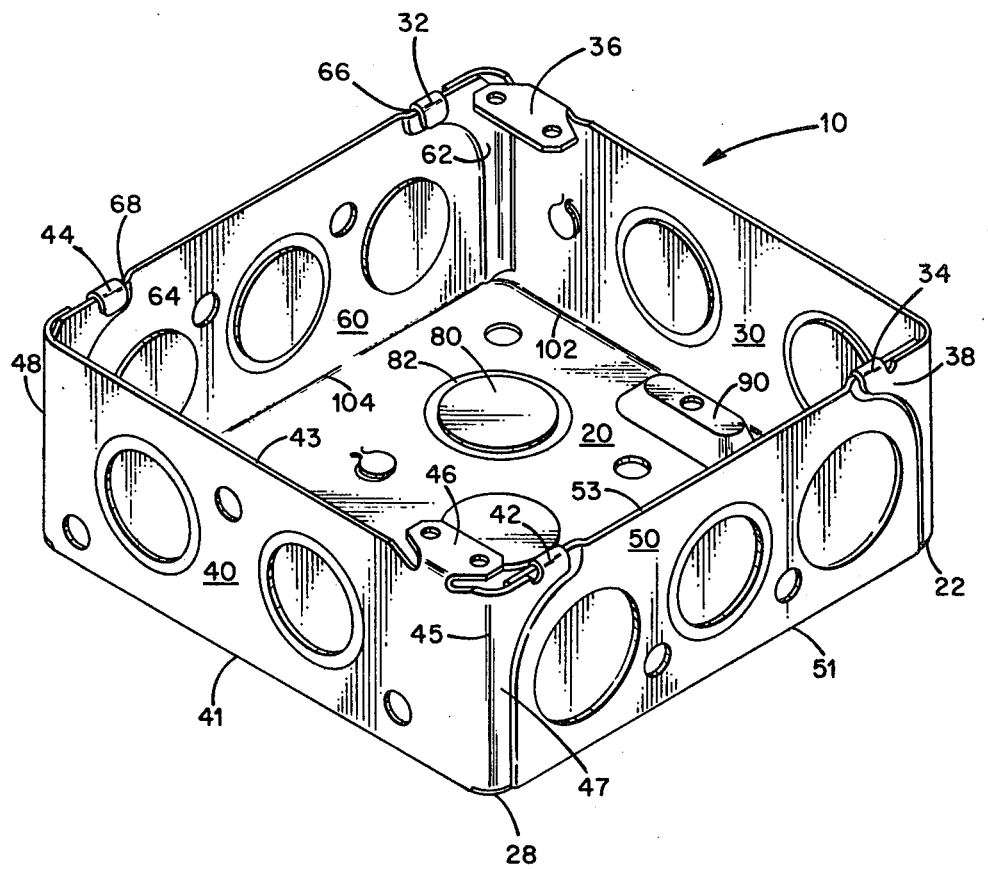
FIG. 1 is a perspective view of an electrical wiring box in accordance with the present invention.

Referring to FIG. 1, there is shown a unitary folded electrical wiring box 10 in accordance with a preferred embodiment of the present invention. The box comprises a flat base portion 20 which may be square, rectangular, octagonal or other polygonally shaped configuration. Sidewalls 30, 40, 50 and 60 are folded to lie generally perpendicularly to the base portion 20. As can best be seen in FIG. 2, the box is fabricated of one piece of sheet metal which is stamped and punched to provide the various desired features prior to folding. Sidewall portions 30, 40, 50 and 60 are integral with the base portion at fold lines 102, 106, 100 and 104, respectively.

Opposite sidewalls 50 and 60 are provided by the stamping operation with indentations 52, 54, 62 and 64. The indentations are further provided with slots or tab-receiving notches 56, 58, 66 and 68 in the outermost edges of each sidewall 50 or 60.

Opposite sidewalls 30 and 40 are provided with extended portions 37, 38, 47 and 48 which extend the sidewalls 30 and 40 laterally beyond fold lines 100 and 104 in the flat layout 5 of the electrical wiring box. These extended portions 37, 38, 47 and 48 terminate respectively in tabs 32, 34, 42 and 44.

When the sidewall portions 30, 40, 50 and 60 are folded upward as shown in FIG. 1, adjacent sidewalls meet to form a corner region such as corner region 45 formed by sidewalls 40 and 50. At each corner region, the extended part of one sidewall is folded around the corner to lie generally parallel with the adjacent sidewall and to mate with the indentation in the second sidewall, creating a flat surface. With the extended portion of one sidewall mating with the indentation on the adjacent sidewall, the tab on the extended sidewall portion is juxtaposed against the slot or tab-receiving notch on the second sidewall. The tab is then folded over the top of the notched sidewall, engaging the notch to prevent lateral or sliding movement of the tab along the edge of the indented sidewall. The two sidewalls are thus rigidly fixed relative to one another at the corner without the need for any welding. Moreover, the configuration allows for easy folding and mating of the tab and notch without the problems inherent in designs where tabs must dovetail or be fed through a slotted opening.

The cooperative action of these features clearly can be seen in FIG. 1 where extension 47 of sidewall 40 is shown folded around corner 45 to lie along sidewall 50 mating with the indented portion of sidewall 50. Tab 42 is shown folded over the top edge of sidewall 50, engaging the slot in sidewall 50.

Figure 2:
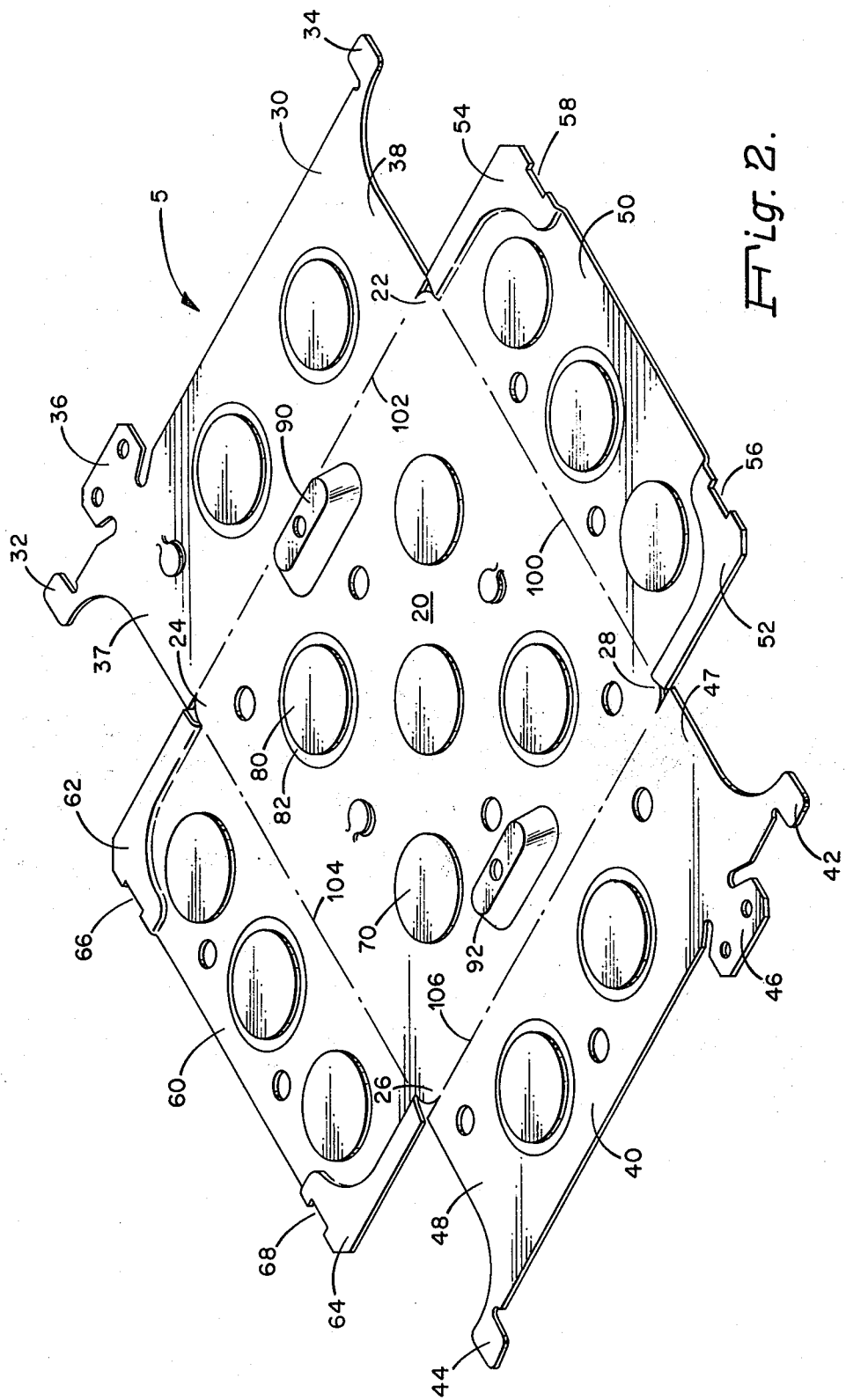
FIG. 2 is a blank layout for the electrical wiring box of FIG. 1.

Referring again to the flat layout shown in FIG. 2, the corners 22, 24, 26 and 28 of the base portion 20 are shown rounded. This preferred configuration permits folding the sidewall to a rounded corner region resulting in a finished box with no sharp corner points or edges.

The flat layout of FIG. 2 also shows features of the box including knockouts 70 and 80, the latter shown with additional knockout rings 82 for standard sizes of electrical conduit. Bosses 90 and 92 are provided with threaded screw-receiving holes to provide for the attachment of grounding wires. Tabs 36 and 46 in sidewalls 30 and 40, respectively, are folded over in the finished box to lie generally parallel to the box base 20. These tabs are positioned appropriately along the respective sidewalls to permit the attachment of a cover plate or provide for the mounting of a wiring device such as a switch or outlet in the box.

The configuration of boxes in accordance with the present invention provides for efficient fabrication by feeding a pre-galvanized strip of sheet steel into a progressive die which forms all parts of the box, makes the necessary bends and with each stroke of the press ejects a box having all parts in position. The box has structural rigidity and strength comparable to unitary drawn boxes without requiring costly and time-consuming welding steps in its fabrication.

While there have been shown and described what are presently considered the preferred embodiments of the invention, it will be obvious to those skilled in the art that various changes and modifications may be made therein without departing from the scope of the invention as defined by the appended claims.

What is claimed is:

1. A unitary folded metal electrical wiring box comprising:
   a generally flat base portion having a polygonally shaped periphery defined by a plurality of angularly disposed straight edges;
   an equal plurality of sidewall portions;
   said plurality of sidewall portions comprising first and second adjacent sidewall portions, each having a first and second edge;
   each of said sidewall portions disposed generally perpendicularly to said base portion and integrally joined thereto along a portion of said first edge, said first edge being a fold line coincident with a straight edge of said base portion;
   said first and second sidewall portions disposed at an angle with one another to form a corner region;
   said first sidewall portion providing an indented portion adjacent to said corner region, said corner region being rounded;
   said indented portion being indented inwardly and extending from said first edge to said second edge of said first sidewall portion;
   said second sidewall portion providing an extended portion extending from said first edge to said second edge of said second sidewall portion and being folded around the corner at said corner region to lie generally parallel to said first sidewall portion and mate with said indented portion of said first sidewall portion creating a flat surface;
   said extended portion of said second sidewall portion having means engaging said first sidewall portion;
   said means for engaging comprising a tab disposed on said extended portion of said second sidewall portion, said tab being folded inwardly over said second edge of said first sidewall portion gripping said first sidewall portion;
   further including tab engaging means in said second edge of said first sidewall portion for receiving said tab to prevent lateral movement of said tab along said second edge;
   said tab engaging means comprising a notch in said second edge of said first sidewall portion at said indented portion.

* * * * *